United States Patent [19]

Nelson

[11] 3,953,325

[45] Apr. 27, 1976

[54] PULP SCREEN WITH ROTATING CLEANING FOIL

[76] Inventor: Douglas G. Nelson, 300 Glenvista Court, Centerville, Ohio 45459

[22] Filed: Sept. 27, 1972

[21] Appl. No.: 292,746

[52] U.S. Cl. .............................. 209/273; 209/306; 209/379; 210/415
[51] Int. Cl.² ........................................ B07B 1/04
[58] Field of Search ............... 415/DIG. 1; 210/391, 210/397, 415; 209/273, 305, 306, 379

[56] References Cited
UNITED STATES PATENTS

| | | | |
|---|---|---|---|
| 2,501,614 | 3/1950 | Price | 415/DIG. 1 |
| 2,597,510 | 5/1952 | McBride | 415/DIG. 1 |
| 3,845,863 | 11/1974 | Savis | 209/303 |

FOREIGN PATENTS OR APPLICATIONS

| | | | |
|---|---|---|---|
| 730,147 | 5/1955 | United Kingdom | 415/DIG. 1 |
| 1,085,227 | 9/1967 | United Kingdom | 415/DIG. 1 |
| 1,095,109 | 12/1954 | France | 210/391 |
| 1,118,259 | 3/1956 | France | 415/DIG. 1 |
| 1,227,991 | 3/1960 | France | 210/397 |

Primary Examiner—Robert Halper
Attorney, Agent, or Firm—Joseph Patrick Burke

[57] ABSTRACT

A negatively pressurized rotating hollow foil pulse device having a curved leading surface, a V-shaped trailing surface and one or more openings in the trailing surface is placed in close proximity to a pulp screen for removing oversized pulp reject material. A rotating disc seal separates a reject compartment from the material to be screened.

14 Claims, 6 Drawing Figures

FEED
ACCEPTS
REJECTS

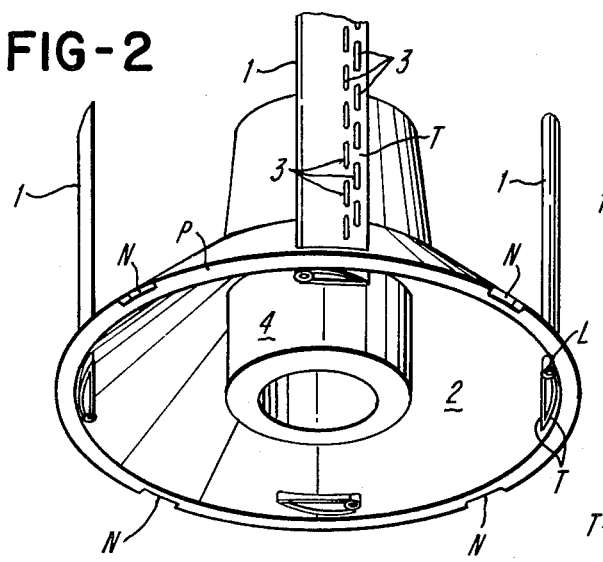
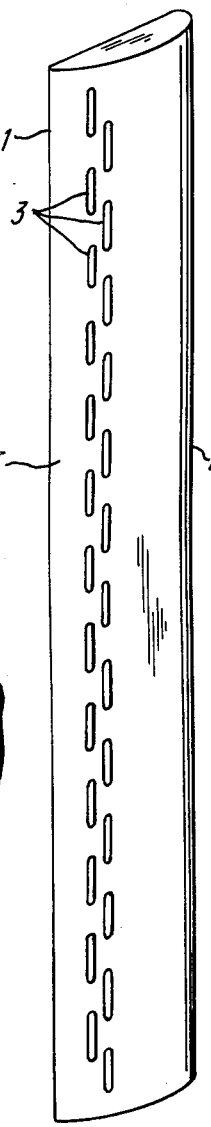
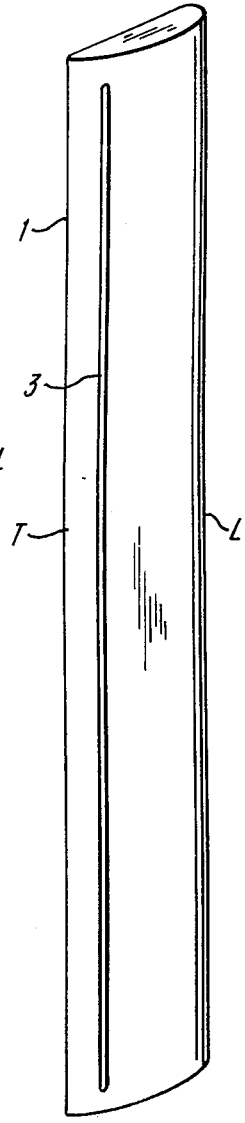
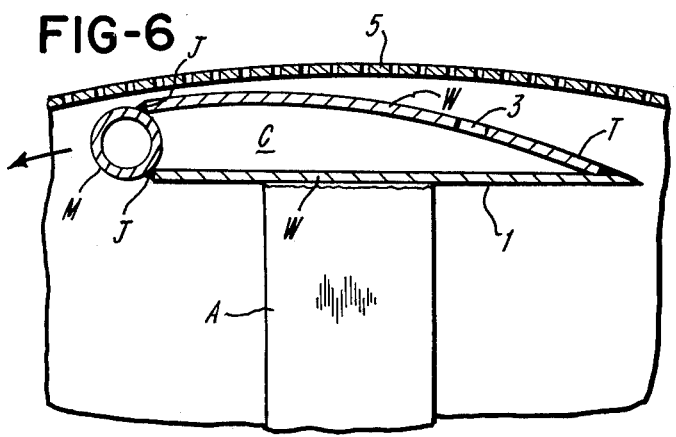
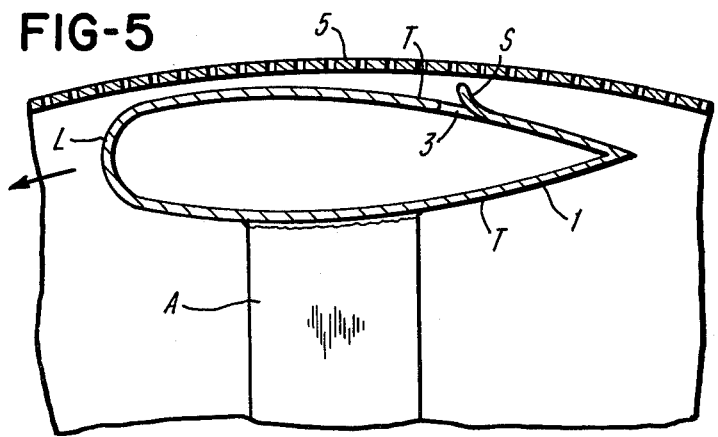

PULP SCREEN WITH ROTATING CLEANING FOIL

This invention is directed to a negatively-pressured, hollow foil pulse device having one or more openings for removing oversized pulp reject material from a pulp screen while at the same time pulsing accepted pulp stock through the pulp screen plate. Each such foil comprises a hollow foil having a curved leading surface and a generally "V"-shaped trailing surface, the trailing surface having at least one opening along the length thereof, wherein said opening(s) are preferably but not necessarily located closer to the juncture of the "V" than the curved leading surface, and wherein the openings in the trailing surface(s) define negatively pressured zones which enhance removal of oversized pulp reject material from the inlet zone of the feed at the rejects region side of the pulp screen, viz., in close proximity to said screen via the openings through the hollow foil and into a separate rejects compartment, which is usually separate and remote from the pulp screen.

This permits removal of the reject material from the screen plate thereby assisting in cleaning it before the next pressure pulse of incoming feed pulp stock occurs.

The trailing surface of each hollow foil can be provided with scoops located tangentially in respect of the openings to direct rejected material into the openings. The stock inlet end of the hollow foil is closed, whereas the opposite end is open to cause flow of the rejected pulp material through a rejects compartment.

The invention will be discussed in greater detail in conjunction with the accompanying drawings.

FIG. 1 of the drawings is a cross-sectional view of a pulp screening machine utilizing the negatively-pressurized hollow foil pulse devices in accordance with this invention.

FIG. 2 is a bottom, plan view of a portion of the sealing disc showing the bottom (open) portions of the hollow foils extending through the disc.

FIG. 3 is a perspective view of a hollow foil showing one configuration of the openings in the form of a plurality of staggered slots to admit rejects to the inside of the foil.

FIG. 4 is a perspective view of a hollow foil showing an alternative configuration wherein one continuous slot opening is provided to admit rejects into the foil.

FIG. 5 is a sectional view of a foil positioned in respect of a paper pulp screen or basket and indicating the typical position of each hollow foil during rotation in respect of the pulp screen plate and the utilization of scoops tangentially positioned in respect of the reject gathering openings.

FIG. 6 is a sectional view of one configuration for openings which does not employ the scoops of FIG. 5. In the FIG. 6 embodiment, the hollow foil chamber C is distinct from tube member M attached thereto.

Figure 1:
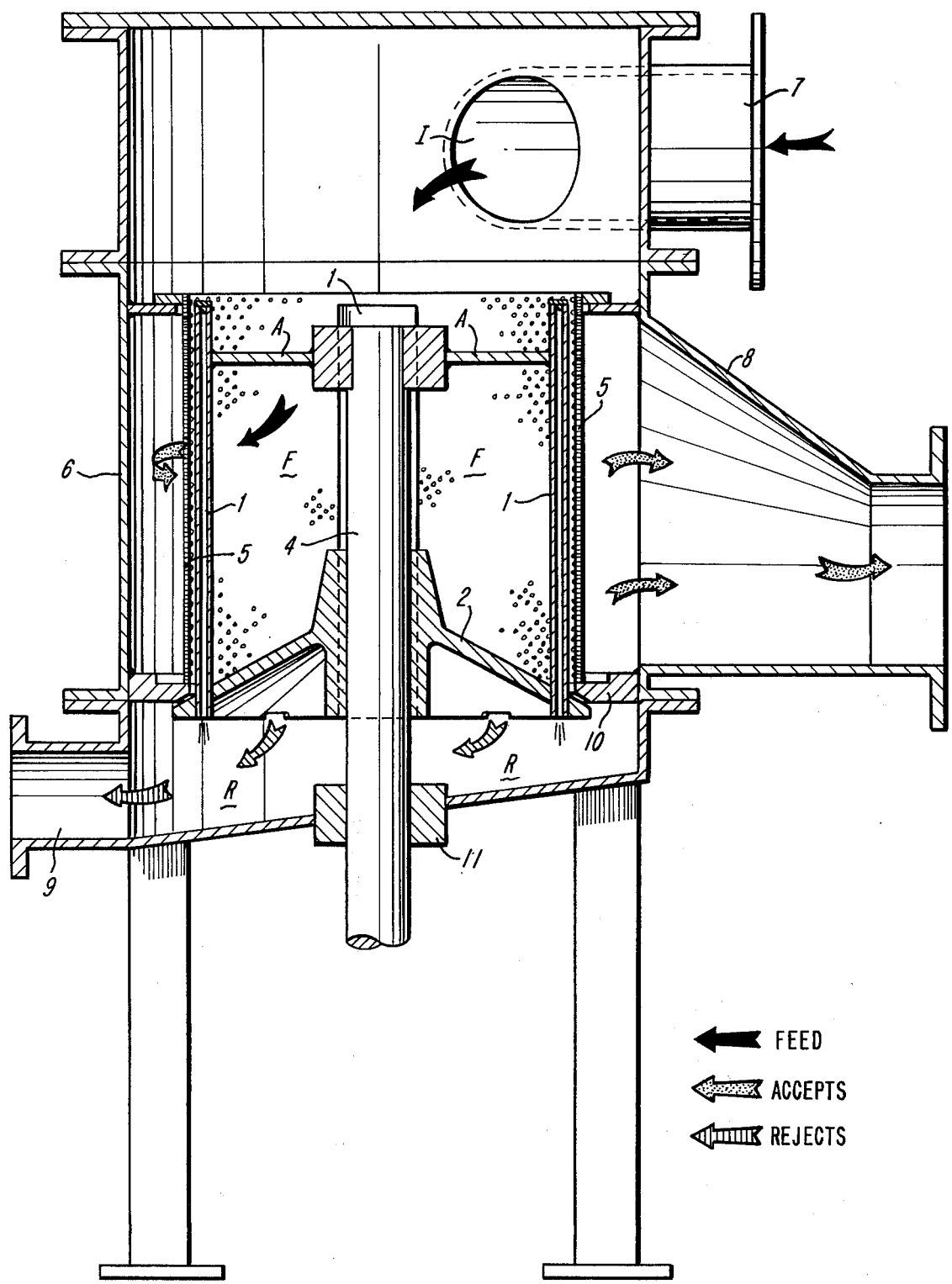

Referring now to the overall structure as shown in FIG. 1, there are positioned a plurality of rotating hollow foils 1 positioned in rotating seal disc 2 through openings provided in the outer perimeter regions thereof. The upper portion of the foils is fixed to shaft 4 by supporting arms A. These rotating hollow foils have one or a plurality of openings 3 (as noted in FIGS. 4 and 3, respectively), usually located in the trailing surface T thereof. Rotating seal disc 2 is secured for rotation with shaft 4. A rotating seal is required to separate the rejects compartment from the material to be screened. Perforated or slotted pulp screen 5 (shown to be stationary) defines a filtering compartment or region F, functions to keep oversized pulp rejects, including clusters or clumps, in the pulp fluid slurry from gaining access into the accepted stock outlet indicated at 8. The generally cylindrical pulp screen 5 is housed in housing 6. Supporting the screen 5 is a ring seal section 10 which serves as a stationary seal cooperating with rotating seal 2 in a close-running seal relationship to prevent rejects from moving back up to the screening area and mixing with fresh feed coming from the inlet 7.

The incoming supply of pulp, e.g. paper pulp, is carried by a fluid gaseous or liquid transport medium, usually an aqueous slurry gaining access to the screen through feedstock inlet 7. The pulp-containing feedstock stream, shown by solid arrows, thence passes from the top to the middle portion of the drawing as shown in FIG. 1 as the feedstock undergoes the screening process with the accepts flow shown by dotted arrows.

In accordance with the operation of the device of this invention, the hollow, negatively-pressurized foil pulse devices help pulse the accepted stock through the screen plate 5 and gather the oversized pulp in the feedstock via the respective opening(s) along the trailing surface T of the foils. The upper portion, viz., the portion of each hollow foil in contact with the inlet stock is closed e.g. by capping, while the opposite end, viz., the end closest to the reject outlet, is either vented to the atmosphere or connected to a vacuum source (not shown) to maintain the flow of rejected material through the foils by establishing a pressure differential whereby the negatively-pressurized foils accelerate the travel of the rejects through the foils, themselves and out of the screening region to rejects outlet 9. The flow of rejects is shown by cross-hatched arrows.

The cross-running seal arrangement utilized to separate the rejects compartment R from the feed material to be screened is comprised of rotating seal 2 and stationary seal ring 10. As will be noted in FIG. 2, the open end of the foils, 1, (usually equidistantly positioned) extend through lower portion P of rotating seal 2. Stationary seal ring 10 also serves as a supporting ledge for the screen 5 and is secured thereto in conventional manner. Seal 2 has one or more notched portions N serving as access pathways to permit oversized rejects (not gathered in openings 3 by the foils 1) to move to the rejects zone R.

As will be noted from FIGS. 2 and 3, the openings 3, can be staggered along the trailing surface of the "V"-shaped foils. A majority or all of these openings can be positioned closer to the juntion of the "V" at the trailing surfaces than the curved leading surface L of the foil, e.g. as shown in FIG. 3. The opening(s) can be in any desired configuration consonant with efficient operation.

The rejects are removed through rejects outlet 9 for further disposition. The reject stream is largely comprised of material passing vertically or horizontally (as the case may be) through the hollow, negatively-pressurized foils and thenceforth into the rejects compartment shown at the lower left-hand portion of FIG. 1. While FIG. 1 illustrates a vertical screen, the foils and foil-screen devices of this invention are likewise applicable to horizontally oriented pulp screens. Also included in the reject stream is the material which is carried in this direction from the surface of the pulp screen plate 5 due to the pulsing by the aforementioned foils of the inlet stream past the slotted screen and through the access pathways defined by notched portions N in seal 2.

Seal 11 isolates the rejects zone R from the exterior portion of shaft 4 which is connected to a power source (not shown) for rotation in conventional manner.

The hollow, negatively-pressured foil pulse devices of this invention when utilized in connection with pulp screens of the conventional type differ from conventional foil-screens in the method of both collecting and removing rejected material. The pulp screen has openings of a given size, which is too small to permit passage of material larger in size. In conventional foil screen devices, the oversize reject material is accumulated in the inlet chamber and increases the rejects concentration in the feedstock until the rejects find their way to the rejects outlet with the conventional foils (usually solid) being the instruments utilized to help pulse the accepted stock through the screen plate. In such conventional pulp foil-screens it is necessary to reject a substantial amount of otherwise acceptable material in order to maintain the flow of rejects to the rejects outlet.

In sharp contrast, the utilization of the negatively-pressurized foil pulse devices of this invention permits removal of rejected material via opening(s) 3 on the foil trailing surfaces as it accumulates at any point on the screen surface. These trailing surfaces T develop a negative pressure which enhances removal of rejected material from the screen plate and cleans it before the next pressure pulse occurs. The rejected material that is removed from the screen vicinity enters the hollow foils to be rejected via outlet 9 thus avoiding contaminating incoming feedstock by accumulation in the vicinity of the screen which would result in increase in rejects concentration of the stock being screened and decrease in screening efficiency. Moreover, only a small proportion of acceptable material is rejected along with the high concentration of oversize rejected pulp, thus minimizing the need for secondary screening before further treatment of rejected material. Since pulp screens are probability devices, the longer the rejects material remains in the inlet compartment I and filtering region F, the greater is the chance of the rejects becoming accepted and contaminating the pulp accepted stock. The present invention reduces the length of time oversize reject material remains in the inlet and filtering compartments and consequently reduces the chances of the rejects becoming accepted. In essence, this invention removes the rejects to the rejects compartment as soon as they are excluded by the screen and removed therefrom by the vacuum pulse. The vacuum foil pulse devices and foil-screen structures of this invention offer a more efficient means for pulp screening than do conventional pulp pressure screens in that the accepted material is cleaner, viz., more free from oversize rejects, than with said conventional foil-screen devices.

In accordance with a preferred embodiment of this invention, as shown in FIG. 5, the hollow foils, 1, contain, in the trailing surfaces thereof, one or a plurality of scoops S projecting tangentially in respect of the opening(s) 3. These scoops are usually located closer to the juncture of the "V"-shaped trailing surfaces than the curved leading surface L and positioned downstream of the openings 3. The scoops assist in deflecting oversized pulp reject material into the internal portion of the hollow foils for removal to outlet 9.

In accordance with another embodiment of this invention, as shown in FIGS. 4 and 6, negatively-pressurized hollow foil 1 has one opening 3 on the trailing surface thereof but extending substantially the entire length of the foil. This embodiment, as shown, has no scoops and the external surface of the foil along the trailing surfaces thereof defines a smooth and uniform curve or surface at the regions of the opening 3. Continuous scoops can be utilized with foils having one continuous opening within the purview of this invention. The foils can be formed of one integral part or from a plurality of sections, e.g., a tubular member M joined to the hollow wing section W at juncture lines J by conventional welding or adhesion procedures.

THE PRIOR ART

One type of prior art pressure-type paper pulp screen device is illustrated in G. M. Dick, U.S. Pat. No. 3,223,239 wherein first stage solid hydrofoils 32 and second stage solid hydrofoils 34 can be replaced by shower pipes 100 and 102 provided with perforations 104 in the face of each shower pipe. The purpose of these perforations in the shower pipes is to provide pressurized streams of fluid to clean the pulp screens. The perforations can be normal to the screens or angularly ahead or behind on a line normal thereto. Water is forced in high pressure streams from inside the shower pipe through the perforations out onto the screens to direct the rejects from the screens 24 and 30 into gutters 48 and 58. There is no teaching in this patent of the negatively-pressurized hollow foil pulse devices having one or more openings in accordance with this invention.

G. M. Dick, U.S. Pat. No. 3,261,468 illustrates a pulp screen cleaning device utilizing inner and outer hollow foils, which foils are hermetically sealed and contain no openings, whatsoever.

A. G. Sandison, U.S. Pat. No. 2,900,077 is directed to the utilization of solid vanes having a cylindrical perforated cylinder hub to force water to propel the vanes to assist in cleaning the main screen and the paper pulp screen in a horizontal screen set-up. No negatively-pressured hollow foil devices having one or more openings are disclosed however.

A. G. Sandison, U.S. Pat. No. 3,145,165 teaches the utilization of at least partially hollow rotating vanes 31 having openings 32 in at least the upper portions thereof to carry dilution water to clean paper pulp screens and force rejects away from the screen and out openings, 39. This Sandison Patent is similar to the aforementioned utilization of water pipes having perforations in U.S. Pat. No. 3,223,239 to G. M. Dick.

S. M. Salomon, U.S. Pat. No. 3,499,528 teaches utilization of a plurality of solid rotatable foils 35 to scrape a paper pulp screen and thereby vary the pulse of liquid suspension carried over the screen.

W. J. Sprau, U.S. Pat. No. 2,796,809 discloses hollow paddles 25 having one or more openings 40 (FIG. 3) or 50 (FIG. 4) to force cleaning water through the wood pulp screen from the inside out, viz., counter current to the flow of aqueous pulp slurry being screened. The paddles are located interiorly of the screen. No provision is made for removing oversized rejects from the screen other than the cleaning water and the paddles would not function as do the foils of this invention due to their location and manner of operation as set forth in this Sprau Patent.

The present invention constitutes an improvement in the pulp screening art in that it efficiently permits removal of oversize pulp reject material from the inlet and screening area soon after rejection by the screen.

While according to a preferred embodiment of this invention the foil opening(s) are located closer to the juncture of the V-shaped trailing surfaces; it is also within the purview of this invention to position one, more or all of the opening(s) closer to the leading surface than the aforementioned juncture of the V-shaped trailing surfaces.

This invention is applicable not only to paper pulp and food processing aqueous slurries, but also any procedure involving screening of solid or semi-solid, e.g. gelatinous, particles from a fluid stream (gaseous or liquid).

What is claimed is:

1. A pulp foil-screen device comprising a generally cylindrical fixed pulp screen having a stock inlet end and an opposite end and openings of a given size causing rejection of oversized material to a rejects region of a screening compartment to close proximity to the screen and permitting passage of smaller material to an accepts region,
   at least one rotatable negatively-pressurized hollow pulse foil having a leading surface and a trailing surface located adjacent to said screen in said rejects region, said foil having at least one opening in the trailing surface thereof to enhance removal of oversized rejects through said foil opening to a separate rejects compartment remote from said screen.

2. A pulp foil-screen device as in claim 1 wherein said foil has a curved leading surface and generally V-shaped trailing surfaces and wherein said foil opening is located closer to the juncture of the V than said curved leading surface.

3. A pulp foil-screen device as in claim 2 wherein a plurality of rotatable hollow pulse foils are fixedly positioned for rotation with a running seal separating said screening compartment from said separate rejects compartment, each said foil having a plurality of reject gathering openings.

4. A pulp foil-screen device as in claim 3 wherein said trailing surface of each said foil has a scoop projecting tangentially in respect of said foil openings to direct rejected material therein.

5. A pulp foil-screen device as in claim 3 wherein said foils are positioned substantially equidistant from one another and said foil openings are staggered on said trailing surfaces.

6. A pulp foil-screen device as in claim 3 wherein each said hollow foil is closed on the stock inlet end and open on the opposite end to cause flow of rejects from the foil to a rejects compartment remote from the pulp screen.

7. A pulp foil-screen device comprising a generally cylindrical pulp screen having a stock inlet end and an opposite end and openings of a given size causing rejection of oversized material to a rejects region of a screening compartment in close proximity to the screen and permitting passage of smaller materials to an accepts region, at least one rotatable negatively-pressurized hollow pulse foil having a leading surface and a trailing surface located interiorally of said screen and adjacent to said screen in said rejects region, said foil having at least one opening in the trailing surface thereof to enhance removal of oversized rejects through said foil opening to a separate rejects compartment remote from said screen.

8. A pulp foil-screen device as in claim 7 wherein said screen and said foil are positioned vertically and the accepts region is located above said rejects compartment.

9. A pulp foil-screen device as in claim 7 wherein a plurality of rotatable hollow pulse foils are positioned substantially equidistant from one another and each said hollow foil is closed on the stock inlet end and open on the rejects end.

10. A pulp foil-screen device as in claim 9 wherein said trailing surfaces of each said foil have a scoop projecting tangentially to direct rejected material therein.

11. A pulp foil-screen device as in claim 9 wherein said hollow pulse foils are fixedly positioned for rotation with a running seal separating said screening compartment from said separate rejects compartment.

12. A process for screening oversized reject pulp material comprising passing feedstock containing acceptable size pulp material and oversized reject material interiorly of a pulp screen to cause rejection of oversized material from the interior of the screen to a rejects region positioned remote from an accepts region, positioning at least one rotatable negatively pressurized hollow pulse foil having a leading surface and a trailing surface containing at least one opening in said trailing surface adjacent to said screen and interiorly thereof so that said screen is between said foil and an accepts compartment, and removing oversized reject material through said foil opening to a separate rejects compartment.

13. A process for screening oversized reject pulp material comprising passing liquid feedstock containing acceptable size pulp material and oversized reject material to contact a substantially cylindrical pulp screen to cause rejection of oversized material to a rejects region positioned remote from an accepts region, positioning at least one negatively pressurized hollow pulse foil containing a leading surface and a trailing surface and at least one opening in said trailing surface adjacent ot said screen and between said feedstock and said screen so that said screen is between said foil and an accepts compartment, separating oversized reject material from the screen vicinity by rotating said foil across said screen, and discharging such separated reject material through the hollow foil and the rejects region.

14. In a particulate separating device having a housing with feedstock inlet and discharge chambers, a substantially cylindrical particulate screening member interposed between said inlet and discharge chambers to divide the discharge chamber into an acceptable particle discharge chamber remote from the inlet and a rejects particle discharge chamber on the inlet side of said screening member, a negatively pressurized hollow pulse foil member having a leading surface and a trailing surface mounted adjacent to the inlet surface of said screening member, said hollow foil member having an opening in said trailing surface adjacent the screening member for receiving reject particles from the inlet side of said screening member, means for rotating said hollow foil member across the adjacent surface of said screening member to separate reject particles from said surface, said hollow foil member being in communication with the reject particle discharge chamber, and a selective seal disposed between said inlet chamber and said rejects particle discharge chamber to restrict feedstock flow for particulate separation in the inlet chamber while permitting feedstock and reject particle discharge therefrom.

* * * * *